May 7, 1957 B. MISHELEVICH 2,791,682
ALTERNATING CURRENT CYCLE REPEATER FOR MEASURING TIME
Filed Feb. 19, 1953 2 Sheets-Sheet 1

INVENTOR.
Benjamin Mishelevich.
BY W. L. Stent
HIS ATTORNEY

May 7, 1957  B. MISHELEVICH  2,791,682
ALTERNATING CURRENT CYCLE REPEATER FOR MEASURING TIME
Filed Feb. 19, 1953  2 Sheets-Sheet 2

INVENTOR.
Benjamin Mishelevich.
BY W. L. Stout
HIS ATTORNEY

United States Patent Office 2,791,682
Patented May 7, 1957

2,791,682

ALTERNATING CURRENT CYCLE REPEATER FOR MEASURING TIME

Benjamin Mishelevich, Pittsburgh, Pa., assignor to Westinghouse Air Brake Company, Wilmerding, Pa., a corporation of Pennsylvania Application February 19, 1953, Serial No. 337,823

16 Claims. (Cl. 246—182)

My invention relates to an alternating current cycle repeater for measuring time. More particularly, my invention relates to an improved and more accurate method for measuring time using an alternating current cycle repeater to activate a relay counting chain or other timing means.

In Letters Patent of the United States No. 2,320,802, issued June 1, 1943, to Clarence S. Snavely for Railway Braking Apparatus, the disclosed apparatus includes a pair of half step relays, operated as an alternating current cycle repeater, which are used to activate relay counting chains to continuously determine the speed of a railway car as it passes through a car retarder. The counting relays, which are successively energized by one of the pair of relays, record the number of cycles of a constant frequency alternating current which occur while the railway car, as determined by the leading pair of wheels still in the retarder, traverses a short, fixed length track section. The number of cycles recorded is an indication of the speed of the car. This indication, as established by the final combination of energized relays in the various unit and multiple counting chains, is used to automatically control the braking pressure exerted on the wheels of the car by the car retarder as the railway car moves through each of several successive short track sections within the retarder length, depending on the desired leaving speed preselected for that car or cut of cars.

Since no special provisions are made to control the position of the half step relays, which are of the magnetic stick type, at the end of any period of operation, up to four half cycles of the alternating current may be lost from the count at the beginning of a period. The actual extent of this loss depends upon the cut-off point, i. e., relay armature position, for the last period of operation and how the first cycle of alternating current is split in starting a new period. If the normally accepted standard frequency of 60 cycles per second is being used, the maximum time lost from any count is approximately 33 milliseconds. In car retarders, for which the original scheme was principally designed, the relatively low speed of the cars keeps the percentage of error low, even though the speed is measured over short distances. Even at 15 miles per hour, which is a relatively high speed for such installations, a maximum error would mean that the car was traveling about 3.5 miles per hour slower than indicated. While not desirable, this error can be tolerated, since the speed in a final retarder will be less than 10 miles per hour, at which speed the error is less than 15%.

In the copending application for Letters Patent of the United States, Serial No. 328,389, filed December 29, 1952, by Sih Hsuin Tsiang, for an Alternating Current Cycle Repeater for Time Measuring Means, now Patent No. 2,763,775, issued September 18, 1956, an improvement on the above arrangement is disclosed in which the initial position of the half step relays and the polarity of the alternating current, as applied to these relays, are controlled so as to reduce the delay in starting the operation of the counting chain. The loss of time for each period is reduced to approximately one half cycle of the alternating current or between 8 to 12 milliseconds when the frequency of the alternating current is 60 cycles per second. This loss is so nearly the same for each period of operation that, in a series of successive measurements, the results can be compensated for this error.

Although the above arrangement is therefore more accurate than the original scheme, the problem of measuring the speed of fast moving vehicles other than railway cars moving through a car retarder requires that, if possible, all error due to such delay in starting the measurement of time be eliminated. Also, the more accurately the speed of railway cars in a car retarder can be measured, the more nearly can completely automatic operation of railway classification yards be realized. Elimination of all error requires that the timing means or the relay counting chain be activated by the cycle repeater on the first half cycle of the alternating current. In addition, the apparatus as disclosed in the previously mentioned Patent No. 2,763,775, requires, in its preferred form, three relays in addition to the half step relays, a total of five relays. From an economic standpoint, a reduction in this number of relays while maintaining an increased accuracy would be a great advantage.

An object of my invention therefore is to provide an improved and more accurate means for measuring time by the method of counting the cycles of an alternating current.

Another object of my invention is to provide a more accurate means for measuring the speed of a vehicle moving through a fixed distance.

A further object is to provide an improved means for automatically determining the necessary braking force to exert on a railway car in a car retarder to obtain a desired leaving speed for that car.

Another object of my invention is to effect a reduction in the amount of apparatus required while maintaining an increased accuracy in measuring time.

A feature of my invention in accomplishing the objects is the provision of a single relay alternating current cycle repeater, with additional circuit means, including two other relays, rectifiers, and reactors, to retain the cycle repeater relay in a selected initial position prior to operation, to detect the polarity of the first half cycle of the alternating current at the beginning of a period of operation, and to apply the alternating current to the single relay cycle repeater in such a manner that the single relay will begin operation during the first half cycle.

Other objects and features of my invention will be apparent from the description which follows taken in connection with the accompanying drawings.

I shall describe two forms of apparatus embodying my invention and shall then point out the novel features thereof in claims.

In the accompanying drawings, Fig. 1 is a diagrammatic view showing one form of apparatus embodying my invention, when used in connection with apparatus for repeatedly measuring the speed of a railway car as it passes through a car retarder.

Similar reference characters refer to similar parts in all views.

Figure 1:
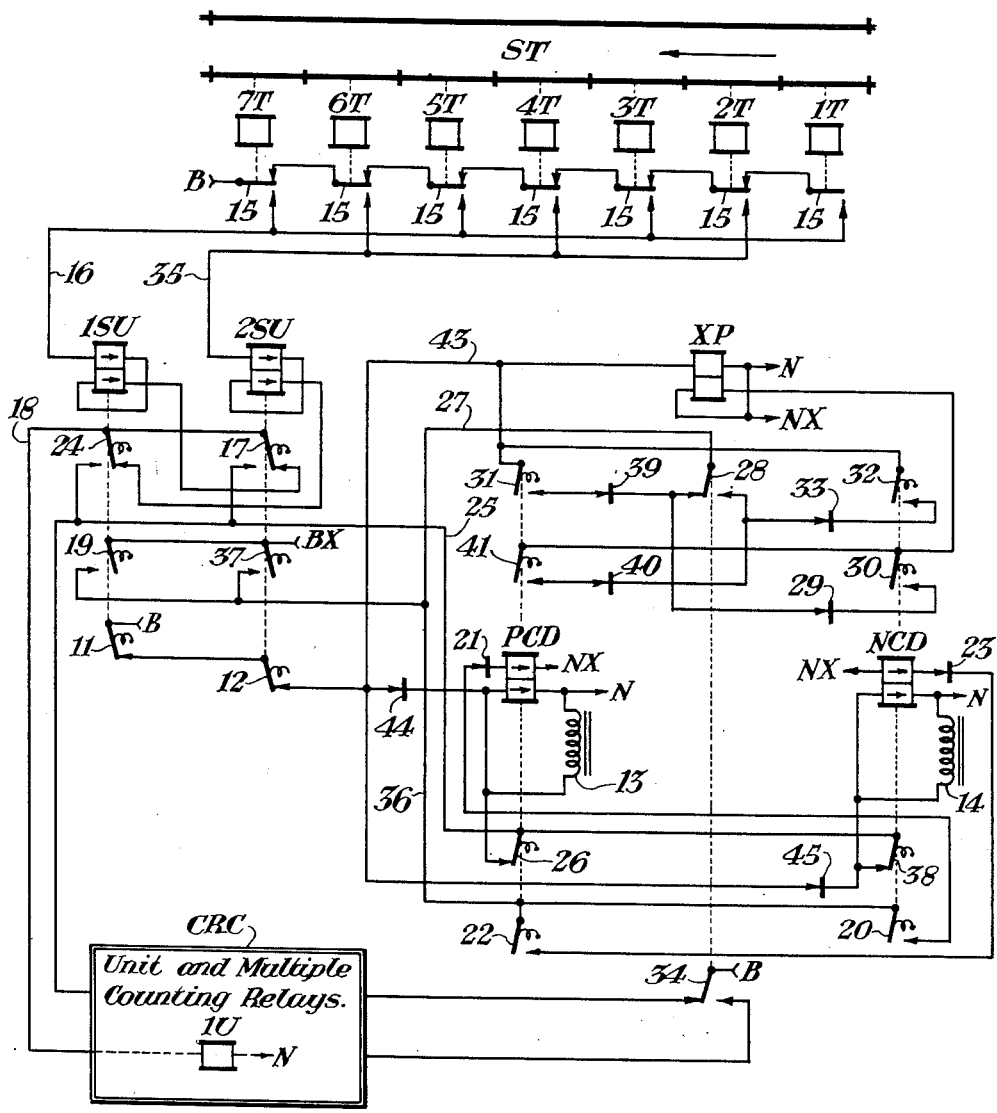
Figure 3:
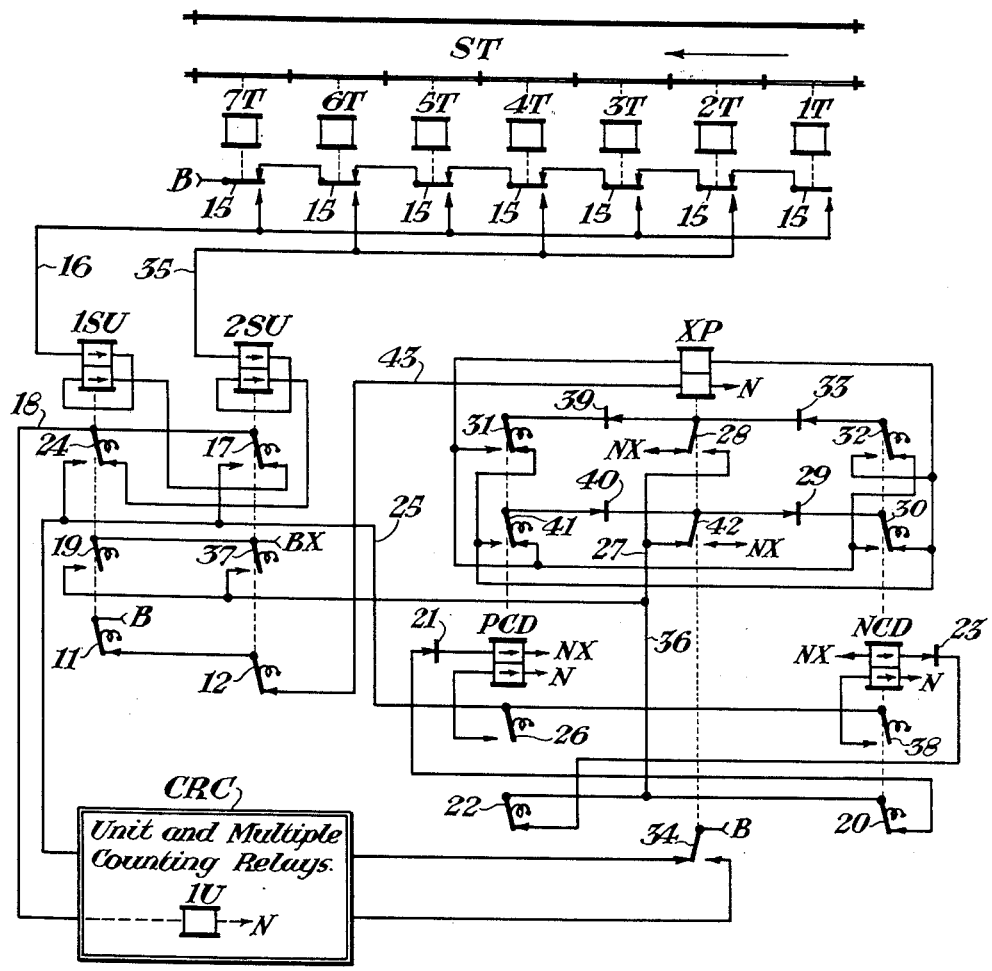
Fig. 3 is a diagrammatic view of a second form of apparatus embodying my invention.

In Figs. 1 and 3, there is represented apparatus for repeatedly measuring the speed of a railway car as it passes through a stretch of railway track such as a car retarder or similar unit. The stretch of track is represented at the top of both Figs. 1 and 3 and is designated by the reference character ST. It is shown divided into seven consecutive track sections, each provided with a track circuit. It is the usual practice in car retarder installations that these track sections be of a length that will accommodate only one pair of wheels of a railway car at a time, this length being approximately three feet, one and one half inches. Traffic normally moves through the stretch of track in the direction indicated by the arrow. The relays in the upper portion of these two drawings, 1T to 7T, inclusive, represent track relays for the series of seven track circuits within the said stretch, a dotted line indicating the track sections with which each relay is associated. The track circuits are not shown in detail as they form no part of my invention and may be of any usual and well-known type. Preferably, they are of the type shown in the copending application for Letters Patent of the United States, Serial No. 283,931, filed April 23, 1952, by David P. Fitzsimmons, for Railway Car Speed Determining and Control Apparatus, now Patent No. 2,751,492, issued June 19, 1956. Therefore, each of the relays 1T to 7T, inclusive, is normally energized by its track circuit and becomes deenergized and releases when a car occupies the track section with which it is associated.

The actual determination of the speed of a railway car in each section of track is made by the unit and multiple counting relays which are represented in block form in the lower portion of Figs. 1 and 3 and are designated by the reference character CRC. The counting relay chains CRC which comprise the unit and multiple counters are identical with those disclosed in said Letters Patent of the United States No. 2,320,802 and, since they are not part of my invention, are not shown in detail. The operation of these counting relays does not add to the novelty of operation of the apparatus shown in either Fig. 1 or Fig. 3, and mention of them will be made only as they are operated in conjunction with the said apparatus, reference being made to Patent No. 2,320,802 for a full description of such counting relay chains.

While in both drawings the apparatus embodying my invention is shown used for repeatedly measuring the speed of a railway car in a card retarder, this is by way of illustration only as there are many other places where this apparatus can be used. Hence it is to be understood that the invention is not limited to measuring the speed of railway cars and that it can be used to measure the speed of other vehicles moving over other trackways. Furthermore, while seven consecutive track sections are shown, the invention is not limited to any particular number of measuring sections and only one section or a relatively large number of sections could be provided.

The relays 1SU and 2SU shown in the left-hand portion of both Figs. 1 and 3 are used to start or initiate the action of the cycle repeated and will be normally referred to hereinafter as the "initiating" relays. In the apparatus as shown, the relay 1SU is energized in response to the release of the armatures of the odd-numbered track relays 1T, 3T, 5T, and 7T, respectively, while relay 2SU correspondingly is energized in response to the armature release of the even-numbered track relays 2T, 4T, and 6T. While here shown as two relays, the "initiating" relay means may be a single relay or a set of controlled contacts in other types of installation using the apparatus embodying my invention to measure the speed of vehicles under different conditions.

The relays 1SU and 2SU are shown as biased relays but they may be relays of the ordinary neutral type. The control circuits for these relays form no part of my invention but are shown for the purpose of providing a clear understanding of the operation of the apparatus. The circuits as shown are a form of the control circuits for these relays as shown in the aforementioned Patent No. 2,751,492.

The cycle detector relays PCD and NCD shown in both Figs. 1 and 3 are also of the biased type. In common with relays of this type, including the previously mentioned relays 1SU and 2SU, these relays will operate their armatures to close their normal or left-hand contacts only when current flows through either winding or both windings in the direction indicated by the arrow. This position of the armature will also be referred to hereinafter as the first position and the contacts as first position contacts. When these relays are deenergized or are energized by current flow in the direction opposite to the arrow, the armatures are biased to operate to a second position closing reverse or right-hand contacts as viewed in the drawings. These contacts will be also referred to as the second position contacts.

The cycle repeater relay XP shown in all four figures of the drawings is of the magnetic stick type. The construction of this type of relay is such that when current flows in either or both windings of the relay from left to right, the relay armature will be moved to the normal or left-hand position as viewed in these drawings, closing normal contacts, and when current flows in either or both windings of the relay from right to left, the relay armature will be operated to the reverse or right-hand position closing reverse contacts. When the relay windings are completely deenergized, the armature remains in the position to which it was last operated. These positions of the armature will also be referred to as the first position and the second position, respectively, and the associated contacts as first position contacts and second position contacts.

In Fig. 1 and Fig. 3 of the drawings, the system is provided with a source of direct current not shown but having positive and negative terminals indicated by the reference characters B and N, respectively. Similarly, in all views, a source of constant frequency alternating current is provided but not shown, having its terminals indicated by the reference characters BX and NX. Each of these terminals alternately has a positive or a negative polarity with respect to the other terminal with each alternate half cycle of the alternating current. That is, when terminal BX has a positive polarity, terminal NX will have the negative polarity; and in reverse, when terminal BX is negative, terminal NX will be positive. The term "positive half cycle" as used herein will refer to the half cycle of the alternating current during which terminal BX has the positive polarity; conversely the term "negative half cycle" will refer to the half cycle during which the terminal NX has the positive polarity. It will be assumed throughout the following description that current flows from the positive to the negative terminal of a source of energy through whatever series of wire leads, contacts and relay windings is being discussed. This is the usually accepted direction of current flow. Therefore, the current will flow from terminal B to terminal N of the direct current source. Also, instantaneous current from the alternating current source will flow from whichever terminal, BX or NX, has at that instant the positive polarity to the other terminal which will be negative. During a "positive half cycle", for example, current flows from terminal BX through the circuit to terminal NX.

Referring now to Fig. 1, the apparatus which embodies my invention comprises the alternating current cycle repeater relay XP, the positive cycle detector relay PCD, the negative cycle detector relay NCD, and the various circuit means including half wave rectifiers, reactors, and relay contacts which interconnect these three relays to produce the desired operation. In order to provide a basis for better understanding of the operation of this apparatus, the basic circuit for the cycle repeater relay XP as used in Fig. 1 is shown in Fig. 2.

Figure 2:
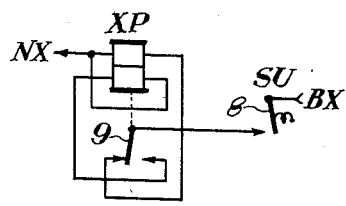
Fig. 2 is a diagrammatic view of the basic circuit of the single relay alternating current cycle repeater as it is embodied in the arrangement of Fig. 1.

Referring now to Fig. 2, there is shown therein the cycle repeater relay XP with a normal and a reverse contact 9, a contact 8 of an "initiating" relay SU, and the terminal BX and NX of the source of alternating current energy. Relay SU represents either of the similarly designated "initiating" relays in Fig. 1 and may be controlled by a similar circuit arrangement. However, for the purpose of discussing the operation of the circuit arrangement of Fig. 2 as an alternating current cycle repeater, it is necessary only to assume that the windings of relay SU, which are not shown, are energized in any suitable manner at the beginning of any period of operation.

Let us now assume that the relay SU is energized and operates to close its normal or first position contact 8. The contacts of relay XP are considered to be occupying the position shown. If contact 8 is closed at the beginning of a "positive half cycle" of the alternating current so that terminal BX has a positive polarity, current will then flow through the circuit passing from terminal BX of the source over normal contact 8 of relay SU, normal contact 9 of relay XP, and the upper winding of relay XP to terminal NX of the source. Since the flow of this current is from right to left in the winding of relay XP, the armature of this relay is operated to its reverse position, closing reverse contact 9. During the next half cycle of the alternating current when terminal NX has a positive polarity, current will flow in the circuit passing from terminal NX of the source through the lower winding of relay XP, reverse contact 9 of relay XP, and normal contact 8 of relay SU to terminal BX of the source. However, since this current flows from right to left through the lower winding of relay XP, the armature of this relay, being already in its reverse position, does not move during this half cycle.

During the third half cycle after the "initiating" contact closes with terminal BX again positive, current flows from terminal BX of the source over normal contact 8 of relay SU, reverse contact 9 of relay XP, and the lower winding of relay XP to terminal NX of the source. Now the direction of the current in the lower winding of relay XP is from left to right. The armature of this relay then operates to its normal position closing the normal contact 9. During the fourth half cycle, when terminal NX is again positive, current flow may be traced from terminal NX of the source through the upper winding of relay XP, normal contact 9 of relay XP, and normal contact 8 of relay SU to terminal BX of the source. Again the direction of the current through the winding of the relay XP is from left to right and, since the armature is already in the left-hand or normal position, no action occurs during this half cycle. Thus, under the conditions as assumed at the beginning of this period of operation, the armature of relay XP operates during the first half cycle, which was positive, and during every second half thereafter; that is, during every positive half cycle of the alternating current.

If we assume that the initial half cycle of the alternating current, after relay SU has closed its normal contact 8, is a "negative half cycle", current flows from terminal NX of the source in the circuit passing through the upper winding of relay XP, from left to right, normal contact 9 of relay XP, and normal contact 8 of relay SU to terminal BX of the source. No action will occur during this first half cycle since the armature of relay XP is already in its normal position. In this case, then, during the second half cycle when the terminal BX becomes positive, the action would begin as described in the two preceding paragraphs and operation of the armature of relay XP would occur during this second half cycle and on every positive half cycle thereafter.

If, at the end of a period of operation, the armature of relay XP is left in its reverse position so that the reverse contact 9 is closed instead of the normal contact as shown in Fig. 2, it can be readily seen from the drawing that, during the next period of operation, the initial operation and succeeding operations of the armature of relay XP will still occur during the "positive half cycles" of the alternating current. That is, if the first half cycle after relay SU has operated to close its normal contact 8 is positive, the initial operation of the relay armature will occur at once. But if the first half cycle of the alternating current is negative, the initial operation of the relay armature will not occur until the second half cycle. It is also obvious, by referring to the drawing, that the circuits may be arranged, if desired, for operation of the relay armature only during "negative half cycles".

It is seen then from the above description that operation of the armature of relay XP, as shown in Fig. 2, may begin on either the first or the second half cycle of the alternating current after the initiating relay contact is closed. In order to assure that operation of the relay armature XP starts always on the first half cycle, the alternating current must be applied so that the polarity at the relay winding is always the same regardless of the actual polarity of the first half cycle, and is such as to cause the relay armature to move to its other position. In practicing my invention, I accomplish this in the following manner. The armatures of relays PCD and NCD, which are retained in their normal position when the apparatus is not measuring time, are released upon operation of the initiating relay and then one or the other of these relays, depending upon whether the first half cycle of the alternating current is positive or negative, respectively, is immediately reenergized with the proper polarity to cause its armature to move back to the normal position. The alternating current is then applied to the relay XP over contacts of the non-selectively operated detector relay in conjunction with the various half wave rectifiers so that the polarity of the voltage at the winding of relay XP is proper to cause immediate operation of the relay armature.

In describing the operation of the apparatus in Fig. 2, it has been assumed that when a relay is energized with proper polarity, during a half cycle of alternating current, operation of the armature will occur only if the energy is applied during the first part of the half cycle when the value of the voltage is rising. It is considered that insufficient energy is provided during the latter part of a half cycle of alternating current to cause operation of a relay armature. In the following description then, this latter portion of a half cycle of alternating current will not be mentioned, and will be lost to the counting operation if the initiating relay normal contacts close during such a period.

A detailed description of the operation of the apparatus in Fig. 1 will now be given. The apparatus in Fig. 1 is shown in its inactive or non-measuring position; that is, the position it assumes when the stretch of track ST is unoccupied. Under this condition, the track relays 1T to 7T are energized and thus have their armatures in the picked up position closing front contacts and opening back contacts. The relays 1SU and 2SU are thus deenergized and since these relays are of the biased type, their armatures are in the reverse or right-hand position closing reverse contacts. Normally in an inactive state, the armatures of the relays PCD and NCD, also of the biased type, would likewise be in their reverse positions. However, in this case, direct current energy is supplied to retain the armatures of these two relays PCD and NCD in their normal positions. The circuit for supplying this direct current energy can be traced from terminal B of the source over reverse contacts 11 and 12 of the relays 1SU and 2SU, respectively, and then through rectifier 44 and the lower winding of relay PCD, in multiple with rectifier 45 and the lower winding of relay NCD, to terminal N of the source. This current is of the proper direction to cause the relay armatures to move to their normal position. It should be noted at this time that in multiple with the lower windings of relays PCD and NCD are reactors designated in Fig. 1 by the reference characters 13 and 14, respectively. The need for these reactors and the rectifiers 44 and 45 will be discussed later in this description.

During this inactive period, relay XP is also energized by direct current energy to set its armature in the normal position. The energy is supplied through a circuit which may be traced from terminal B of the source over reverse contacts 11 and 12 of relays 1SU and 2SU, respectively, wire 43, and the upper winding of relay XP to terminal N of the source. The current flow is from left to right in the relay winding, which will set and hold the armature in its normal position. This energy is kept from the lower winding of relay XP because reverse contacts 30 and 31 of relays NCD and PCD, respectively, are open. This is the principal reason that the relays PCD and NCD must be energized during this inactive period.

As described in connection with the operation of the apparatus of Fig. 2, it was seen that relay XP will operate during the first half cycle of the alternating current, if it is a "positive half cycle", whether its normal or reverse contacts are initially closed. However, in order to assure proper and continuous operation of the relay counting chains of the unit CRC the movement of the armature of relay XP during the first half cycle must be from its normal to its reverse position thereby closing its reverse contacts. This will be more evident from the description of operation which follows shortly. Therefore, provision must be made, as previously described, to set and hold the armature of relay XP so that it will be in a selected initial position, here its normal position, at the beginning of a new period of time measuring, or speed determination.

Let us now assume that a railway car enters the stretch of track ST, more particularly that it enters the first section of this stretch of track. As the leading pair of wheels of the railway car enters track section 1, the track circuit is shunted and relay 1T is deenergized and releases its armature. The closing of the back contacts of relay 1T causes direct current energy to be supplied to the relay 1SU through a circuit passing from terminal B of the source over front contacts 15 of relays 7T to 2T, inclusive, back contact 15 of relay 1T, wire 16, both windings of relay 1SU in series, reverse contact 17 of relay 2SU, wire 18, and various circuits and relay contacts not shown in the counting relay chain CRC, ending with the winding of a first relay 1U of the unit chains, to terminal N of the source. The direction of current flow through the two windings of the relay 1SU is from left to right; that is, in the direction of the arrow, so that this relay operates its armature to close its normal contacts and open its reverse contacts. The armature of relay 1U of the unit counting chain energized in series with relay 1SU also picks up.

The opening of reverse contact 11 of relay 1SU removes the direct current energy from the upper winding of relay XP, but the relay armature remains in its normal position, since relay XP is of the magnetic stick type. The opening of reverse contact 11 of relay 1SU also removes the direct current energy from the lower windings of the relays PCD and NCD and these relays, thus deenergized, release their armatures to return to their biased reverse positions. The movement of the armatures of relays PCD and NCD is aided and speeded by the effect on the relays of the previously mentioned reactors 13 and 14. It is well-known that the effect of a reactor in multiple with a relay winding is to greatly speed the movement of the relay armature to its released position when the relay is deenergized. This effect is here used to cause the armatures of these relays to complete their movement and close reverse contacts prior to the closing of normal contacts of the initiating relays. The need of this action, as will appear hereinafter, is to assure that the closing of normal contacts of the initiating relay will complete at once the circuit for supplying alternating current energy to the cycle repeater relay.

The closing of the reverse contacts of the relays PCD and NCD and then the normal contacts of the relay 1SU completes a circuit to reenergize one or the other of the two cycle detector relays depending upon the polarity of the first half cycle of the alternating current. These circuits may be traced from terminal BX of the source over normal contact 19 of relay 1SU, wire 36, and either reverse contact 20 of relay NCD, rectifier 21, and the upper winding of relay PCD to terminal NX of the source, or reverse contact 22 of relay PCD, rectifier 23, and the upper winding of relay NCD to terminal NX of the source. We shall assume here that the first half cycle of alternating current after the relay 1SU has closed its normal contacts is a "positive half cycle", that is, that the terminal BX of the alternating current source has a positive polarity. The current then flows through the described circuit from terminal BX of the source to terminal NX of the source only in the portion which includes the upper winding of relay PCD. Rectifier 21 is so poled as to pass current flowing in this direction, while rectifier 23 blocks the flow of current in the winding of relay NCD. Since the direction of current flow in the relay winding is from left to right, that is, in the direction of the arrow, the relay PCD will move its armature to the normal position closing normal contacts.

The opening of reverse contact 22 of relay PCD interrupts the circuit for energizing relay NCD during the second half cycle of the alternating current which is a "negative half cycle" and during which the current would be in the proper direction through the relay winding to cause the relay armature to operate. Thus relay NCD remains released during this period of operation.

The closing of normal contact 26 of relay PCD completes a direct current stick circuit for this relay. This circuit may be traced from terminal B of the source over front contacts 15 of relays 7T to 2T, inclusive, back contact 15 of relay 1T, wire 16, the windings of relay 1SU, reverse contact 17 of relay 2SU, normal contact 24 of relay 1SU, wire 25, normal contact 26 of relay PCD, and the lower winding of relay PCD to terminal N of the source. The direction of current flow through the lower winding of relay PCD is from left to right which is in the proper direction to retain the relay armature in its normal position.

The previously mentioned rectifiers 21 and 23 are required in the energizing circuits of relay PCD and NCD, respectively, only to assure the effectiveness of the direct current stick circuits of these relays in retaining the relay armature in its normal position. For example, the rectifier 21 is poled to block the flow of any current in the direction opposite to the arrow in the upper winding of the relay PCD, during a "negative half cycle" of the alternating current, which would tend to cancel the effect of the direct current flowing in the lower winding. Thus, the described direct current stick circuit is effective in retaining the relay armature in its normal position during the period of time that the leading pair of wheels of the car occupies track section 1. Similarly, rectifier 23 is poled to block a flow of current in the upper winding of relay NCD in the direction opposite to the arrow. Such a current would flow during a "positive half cycle" of the alternating current. When the direct current stick circuit for this relay NCD is described later, further mention will be made of this need for rectifier 23.

Rectifiers 44 and 45 are required to prevent the direct current energy from the stick circuit for either relay PCD or relay NCD from energizing the relay XP. Without these rectifiers, direct current could flow in an obvious path through wire lead 43 and the upper winding of relay XP. This current flow would be proper to hold the relay armature in its normal position and would tend to neutralize the proper operation of the relay as an alternating current cycle repeater.

At the same instant that relay PCD is being energized by alternating current, a circuit is also completed for energizing the cycle repeater relay XP during this first half cycle of the alternating current after the normal contacts of the "initiating" relay are closed. This circuit may be traced from terminal BX of the source over normal contact 19 of relay 1SU, wire lead 27, normal contact 28 of relay XP, rectifier 29 in its forward direction, reverse contact 30 of relay NCD, and the lower winding of relay XP to terminal NX of the source. A parallel circuit over the reverse contact 31 of relay PCD prior to the operation of the armature of this relay to its normal position on the first half cycle of alternating current is blocked by rectifier 39 which prevents flow of current in this direction. The flow of current in the lower winding of relay XP during this first half cycle is in the direction from right to left which causes the relay armature to operate to its reverse position, closing reverse contact 28 of this relay.

The closing of reverse contact 28 of relay XP completes a circuit which may be traced from terminal BX of the source over normal contact 19 of relay 1SU, wire 27, reverse contact 28 of relay XP, rectifier 33, reverse contact 32 of relay NCD, and the upper winding of relay XP to terminal NX of the source. A parallel circuit to the latter part of this circuit is open at reverse contact 41 of relay PCD, whose armature has operated to its normal position by this time. However, during the second half cycle of the alternating current after the "initiating" relay has operated, during which half cycle the terminal NX has the positive polarity, the flow of current in the just described circuit is blocked by rectifier 33, and no action occurs in the apparatus.

During the third half cycle of the alternating current, which is again a "positive half cycle," current flows in the circuit last described from terminal BX to terminal NX of the source, since rectifier 33 is poled to pass current of this polarity. Thus the direction of current flow in the upper winding of relay XP is from left to right, which is in the proper direction to cause the relay armature to operate to its normal position, again closing normal contact 28 of relay XP.

The closing of normal contact 28 of relay XP again completes the circuit as described for the first half cycle of the alternating current. However, during the fourth half cycle, which is a "negative half cycle", the flow of current from terminal NX to terminal BX of the source through this circuit is blocked by rectifier 29, which is poled to pass current only during "positive half cycles". Thus no action occurs during the fourth half cycle. This completes one cycle of operation of the cycle repeater relay XP. It is obvious from the drawing and from the foregoing description that the relay is now conditioned to operate its armature once again to the reverse position during the next half cycle of alternating current, that is, the fifth half cycle, and to continue to repeat the cycle of operation just described as long as the leading pair of wheels of the car are in track section 1. From the foregoing description of the operation of relay XP, it can also be seen that the relay armature operates once during each cycle of the alternating current, alternately closing reverse contacts and normal contacts, respectively, on alternate cycles of the alternating current.

When the armature of relay XP initially moves to the reverse position during the first half cycle, direct current energy is supplied over reverse contact 34 of this relay to the unit and multiple counting relay unit CRC and energizes the second relay in the counting chain, whose armature then picks up. It was previously noted that the first relay of the chain, 1U, was energized and its armature picked up at the same time that the relay 1SU was energized. Operation of the armature of the second relay during this first half cycle thus continues the action of the counting chain without loss of time. The other relays of the counting chain pick up in succession as the armature of relay XP is subsequently operated to close alternately the normal and the reverse contacts 34. Thus the counting relay chain counts and records the cycles of the alternating current which occur during the passage of the leading pair of wheels of the railway car through the track section 1 and thus determines the speed of the car. As is described in the previously mentioned Patent No. 2,320,802, this operation of the unit and multiple counting relays may be used to control the operation of a car retarder in braking the car to a desired speed.

Let use now assume that the leading pair of wheels of the railway car, having traversed the track section 1, enters track section 2. This shunts the track circuit of this track section and relay 2T is deenergized and releases its armature. The opening of front contact 15 of relay 2T opens the circuit supplying direct current energy to relays 1SU and PCD. These relays being of the biased type, upon deenergization their armatures return to their reverse positions. The supply of direct current energy to the unit CRC is also interrupted and the counting chain relays release and reset to prepare for a new period of operation.

The release of the armature of relay 1SU opens the circuit supplying alternating current energy to the cycle repeater relay XP at normal contact 19 of the relay 1SU and the operation of relay XP ceases. The closing of reverse contact 11 of relay 1SU, while reverse contact 12 of relay 2SU is still closed, again completes the retaining circuit for the relays PCD and NCD, as previously described, and these relays are energized and move their armatures to the normal position. Also, direct current energy is supplied in the circuit traced from terminal B of the source over reverse contacts 11 and 12 of relays 1SU and 2SU, wire 43, and the upper winding of relay XP to terminal N of the source. The direction of this current flow is proper to cause the armature of relay XP to move to its normal position, if not already occupying that position, and the relay XP is thus reset in preparation for a succeeding period of operation.

When back contact 15 of relay 2T and reverse contact 24 of relay 1SU close, a circuit is completed to supply direct current energy to the relay 2SU, which circuit may be traced from terminal B of the source over front contacts 15 of relays 7T to 3T, inclusive, back contact 15 of relay 2T, wire 35, both windings of relay 2SU in series, reverse contact 24 of relay 1SU, wire 18, and various circuits of the unit CRC including the winding of relay 1U of the counting chains to the terminal N of the source. Again, the armature of relay 1U picks up at this time. Also, the direction of current flow in both windings of the relay 2SU is from left to right, that is, with the arrows, and the armature of relay 2SU is operated to its normal position, closing its normal contacts. Reverse contact 24 of relay 1SU is included in the energizing circuit for relay 2SU, and, conversely, reverse contact 17 of relay 2SU in the energizing circuit of relay 1SU, to assure that there will be a brief interval between successive periods of operation when the reverse contacts of both relays will be closed so that the armatures of relay XP and relays PCD and NCD may be reset to their normal positions.

Opening of reverse contact 12 of relay 2SU deenergizes the relays PCD and NCD in the same manner as described previously when relay 1SU was operated and opened its reverse contact 11. Again, the effect of the two reactors 13 and 14 is to cause the armatures of the two relays to very quickly release to close reverse contacts. The opening of reverse contact 12 of relay 2SU also interrupts the direct current energy supplied to relay XP, but since this relay is of the magnetic stick type, its armature does not move and normal contacts remain closed.

Let us assume that the first half cycle of the alternating current, after the armature of relay 2SU has operated to close its normal contacts, is this time a "negative half cycle", that is, the terminal NX of the source has the positive polarity. The relay NCD is then energized at the time the normal contacts of relay 2SU close, with current of the proper direction to cause its armature to pick up, the current flowing in a circuit passing from terminal NX of the source through the upper winding of relay NCD, rectifier 23 in its forward direction, reverse contact 22 of relay PCD, wire 36, and normal contact 37 of relay 2SU to terminal BX of the source. At the same time, rectifier 21 prevents the flow of any current in a similar circuit through the relay PCD and its armature remains in the reverse position. It may be noted here that the rectifier 23 is so poled as to prevent any flow of current in the upper winding of relay NCD during a "positive half cycle" of the alternating current. Also, the operation of the armature of relay NCD to its normal position opens reverse contact 20 which interrupts the circuit for energizing relay PCD from the alternating current source during positive half cycles, and this relay armature thus remains in its reverse position during the present period of operation.

When the normal contacts of relay NCD close a direct current stick circuit for this relay is completed. This circuit may be traced from terminal B of the source over front contacts 15 of the relays 7T to 3T, inclusive, back contact 15 of relay 2T, wire 35, both windings of relay 2SU, reverse contact 24 of relay 1SU, normal contact 17 of relay 2SU, wire lead 25, normal contact 38 of relay NCD, and the lower winding of relay NCD to terminal N of the source. The flow of current in this circuit is of the proper direction to retain the armature of relay NCD in its normal position. Since, as previously described rectifier 23 prevents the flow of any current through the upper winding of the relay NCD in a direction which would tend to cause the release of the relay armature, the direct current stick circuit just described is effective to retain the armature in its normal position throughout this period of time measuring.

The release of the armature of relay PCD closing reverse contacts, and the subsequent closing of normal contacts of relay 2SU complete a circuit to supply alternating current energy to the cycle repeater relay XP. This circuit is completed simultaneously with the circuit for energizing relay NCD, that is, when normal contact 37 of relay 2SU closes. The circuit may be traced from terminal BX of the source over normal contact 37 of relay 2SU, wire 27, normal contact 28 of relay XP, rectifier 39, reverse contact 31 of relay PCD, and the upper winding of relay XP to terminal NX of the source. During the first half cycle of alternating current, when terminal NX is positive, current flows through this circuit from terminal NX to terminal BX, the rectifier 39 being poled to permit current flow of this direction. Prior to the opening of reverse contact 30 of relay NCD, rectifier 29 prevents current flow in the parallel circuit through the lower winding. The direction of flow of current through the upper winding of relay XP is thus in the direction from right to left which causes the armature of this relay to operate to its reverse position, opening normal contact 28 and closing reverse contact 28 of this relay.

Closing of reverse contact 28 of relay XP completes a circuit which may be traced from terminal BX of the source over normal contact 37 of relay 2SU, wire 27, reverse contact 28 of relay XP, rectifier 40, reverse contact 41 of relay PCD, and the lower winding of relay XP to terminal NX of the source. The parallel circuit is now open at the reverse contact 32 of relay NCD. However, during the second half cycle of the alternating current, when terminal BX is positive, the flow of current in this just described circuit is prevented by rectifier 40, which is poled to stop the flow of such current. Since there is no current flowing through the windings of relay XP, no operation of the armature occurs during this half cycle.

The third half cycle of the alternating current is again a "negative half cycle" so that current will flow from terminal NX to terminal BX through the circuit last described, rectifier 40 being poled to permit the flow of such current. Current thus flows through the lower winding of relay XP in the direction from left to right which will cause the relay armature to operate to the normal position, now opening reverse contact 28 and closing normal contact 28.

The closing of normal contact 28 of relay XP again completes the circuit as described during the first half cycle. However, during the fourth half cycle of the alternating current, a "positive half cycle", the rectifier 39 prevents the flow of any current in this circuit and no operation of the armature of relay XP occurs.

This completes one cycle of operation of the relay XP. This operation will continue in a similar manner as long as the leading pair of wheels of the railway car occupies track section 2 of the stretch of railway track. As described during the time that the first section of track was occupied, direct current energy is supplied alternately over reverse and normal contacts 34 of relay XP to the unit and multiple counting relays of the unit CRC in a manner to cause these relays to count and record the number of cycles of the alternating current to determine the speed of the railway car through track section 2. Again the resultant determination of speed may be used to control the operation of a car retarder. The pressure exerted by the car retarder on the wheels of the car may then be automatically reduced as indicated by the speed of the car in section 2 as compared with the speed in section 1.

Similar operation will occur as the leading pair of wheels of the railway car enter the succeeding tract sections, the relay 1SU and the relay 2SU being alternately energized as the track section is an odd-numbered track section or an even-numbered track section, respectively. The speed of the car will be determined in each section by the relay counting chains, and the car retarder controlled by these relays so as to reduce or increase the exerted braking pressure to achieve the desired leaving speed for the car. If desired, when the leading pair of wheels passes out of the stretch of track, the next succeeding pair of wheels may be effective to control the apparatus. By thus continuing the cycle of operation, the speed of the car, or cut of cars may be controlled until the final pair of wheels passes from the stretch of track associated with the car retarder.

In the arrangement of Fig. 1, all the contacts of relays PCD and NCD are independent normal or reverse contacts. That is, no sets of dependent normal and reverse contacts are required. Also, in this arrangement, only two sets of contacts are required for relay XP, which reduces the amount of material required and simplifies construction. Balancing advantages of the arrangement of Fig. 3 will be discussed after describing the operation of the apparatus as shown in that view.

Figure 4:
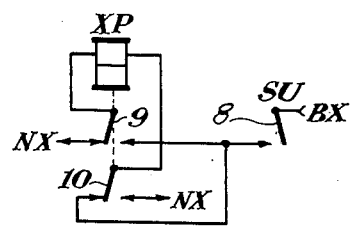
Fig. 4 is a diagrammatic view of the basic circuit of the single relay alternating current cycle repeater as shown in Fig. 3.

Referring now particularly to Fig. 3 and the accompanying Fig. 4 of the drawings, there is shown therein another form of the cycle repeater in apparatus embodying my invention. In Fig. 3, the apparatus comprising my invention is again the cycle repeater relay XP, the cycle detector relays PCD and NCD, and the circuit means including half wave rectifiers and contacts of these relays which interconnect the various relays in a manner to accomplish the desired operation.

Reference to Fig. 4 will give an understanding of the basic circuit and the operation of the alternating current cycle repeater as used in the arrangement of Fig. 3. In Fig. 4, there is shown an alternating current cycle repeater relay XP, two sets of normal and reverse contacts 9 and 10 of this relay, a normal contact 8 of an initiating relay SU, and the terminals BX and NX of the alternating current source. As in Fig. 2, relay SU here represents either of the similarly designated relays in the associated Fig. 3. However, the manner in which relay SU is controlled, so as to operate to close its normal contact 8, is a matter of choice as the circuit arrangement forms no part of my invention.

In describing the operation of the relay XP as shown in Fig. 4, let us assume that the relay contacts are initially in the position shown, and that relay SU is energized in any suitable manner and operates to close its normal contact 8. A further assumption is made that the first half cycle of the alternating current after contact 8 closes is a "positive half cycle". As previously mentioned, if the initiating contact closes during the latter portion of a half cycle of the alternating current when the value of the voltage is decreasing, it is considered that insufficient energy is supplied to the relay to cause operation of the relay armature. Therefore, such a portion of a half cycle of the alternating current is ignored in the following description and only the operation during the next complete half cycle is described.

With normal contact 8 of relay SU closed, current flows in a circuit traced from terminal BX of the source through normal contact 8 of relay SU, normal contact 10 of relay XP, the winding of relay XP, and normal contact 9 of relay XP to terminal NX of the source. Since the direction of flow of this current through the relay winding is from right to left, the relay armature operates to its reverse position closing the reverse contacts. This completes a new circuit between the terminals BX and NX, this circuit being traced from terminal BX of the source over normal contact 8 of relay SU, and reverse contact 9, the winding, and reverse contact 10, all of relay XP, to terminal NX of the source. During the second half cycle of the alternating current, when terminal NX is positive, current flows in this circuit just described through the relay winding in the direction from right to left. Since the armature of the relay is already in its reverse position, no further operation occurs during this half cycle of the alternating current. However, during the third, or succeeding half cycle, when terminal BX is again positive, the current flow in the last described circuit is reversed, that is, from left to right, through the relay winding which causes the armature to operate to its normal position, again closing the normal contacts 9 and 10. This again completes the circuit as described for the first half cycle of the alternating current. During the fourth half cycle after the closing of contact 8, when terminal NX is again positive, the current flow in the circuit is from left to right through the winding of relay XP, and since the relay armature is already in its normal position, no further action occurs during this half cycle.

This completes one cycle of operation of the relay XP, which cycle will repeat as long as contact 8 remains closed. It has been shown that the relay armature of the cycle repeater relay thus operates once during every cycle of the alternating current, that is, it alternately moves to its reverse position or its normal position on alternate cycles of the alternating current. Therefore, a set of normal and reverse contacts of this relay may be used to activate a timing means, such as the unit and multiple counting relay chains of the unit CRC, to record the number of cycles of the alternating current occurring during the period that contact 8 is closed, thus measuring the length of time.

Let us now assume that the first half cycle of the alternating current, after normal contact 8 of relay SU closed, was a "negative half cycle". The current would then flow in the circuit passing from terminal NX of the source through normal contact 9, the winding, and normal contact 10 of relay XP, and normal contact 8 of relay SU to terminal BX of the source. However, since this flow of current through the relay winding is from left to right and the armature of the relay is already in its normal position, no movement of the relay armature occurs during this initial half cycle. Then, during the second half cycle, with terminal BX positive, the flow of current through the same circuit is reversed and the relay armature is operated to its reverse position, closing reverse contacts 9 and 10 of relay XP. This completes a circuit for flow of current during the third half cycle from terminal NX of the source over reverse contact 10 of relay XP, the winding and reverse contact 9 of relay XP, and normal contact 8 of relay SU to terminal BX of the source. Again, the direction of flow of current in the relay winding, being from right to left, is such as to tend to move the armature to its reverse position, which it is already occupying. Thus, no action occurs during the third half cycle. Then, during the fourth half cycle of alternating current, with terminal BX again positive, the flow of current through the just described circuit is reversed, that is, from left to right through the relay winding, and the relay armature operates to its normal position, again closing the normal contacts 9 and 10, and thus completing one cycle of operation of the relay XP.

Let us now assume that the initial position of the armature of the relay XP is with reverse contacts closed and that the first half cycle of the alternating current, after the closing of normal contact 8 of relay SU, is a "positive half cycle". The current would then flow from terminal BX of the source to terminal NX of the source, through a circuit previously traced which includes the normal contact 8 of the relay SU and reverse contacts 9 and 10 and the winding of the relay XP. Since the flow of current in the relay winding would be from left to right, the relay armature would be operated to its normal position. By reference to the drawing and to the previously discussed operation of the relay XP, it is obvious that, in this case also, operation of the armature of relay XP would occur once every cycle of the alternating current, and during the half cycles when terminal BX is positive. If, with the armature of relay XP in the position with reverse contacts closed initially, the first half cycle of the alternating current is a "negative half cycle", the flow of current during the first half cycle would be from right to left in the relay winding, and no operation of the relay armature would occur. However, in this case, during the second half cycle, with terminal BX positive, the direction of current flow would be reversed in the relay winding and, being from left to right, would cause the relay armature to move to its normal position. Again, the continuing operation would be as previously discussed, that is, on every second half cycle thereafter, that is, the "positive half cycles".

From this previous discussion, it can be seen then that the circuits in Fig. 4 are arranged for "positive half cycle" operation only of the armature of relay XP. By reference to the drawing, it is obvious that the circuits can be arranged for "negative half cycle" operation only. It is also to be noted that while the relay XP is shown as having two windings, only the upper winding is used in accomplishing the desired operation. The advantage of having one winding not used in the cycle repeating operation will be shown later in the description of the operation of the apparatus in Fig. 3.

From the description of the operation of the relay XP in Fig. 4 it is apparent that the operation of this relay as an alternating current cycle repeater may begin on either the first or the second half cycle of the alternating current, after the initiating relay has operated, or the initiating contact has closed, depending on the polarity of the first half cycle. By use of the circuit arrangement of Fig. 3, initial operation of the relay XP during the first half cycle of the alternating current is assured under all conditions. In accomplishing this, the two cycle detector relays are selectively operated according to the polarity of the first half cycle of the alternating current; the relay PCD operating its armature if the half cycle is positive, the relay NCD, if it is a "negative half cycle". The cycle repeater relay XP, which is reset to its normal position at the end of each period of operation, is then energized over normal contacts of the selectively operated detector relay and reverse contacts of the non-operated detector relay, with the alternating current applied to the relay winding so poled by half wave rectifiers included in the circuits that the relay XP will operate its armature during the first half cycle of the alternating current, after normal contacts of the initiating relay close, regardless of polarity and during every second half cycle thereafter.

The apparatus in Fig. 3 is shown in its inactive or non-measuring condition, that is, the condition it assumes when no train is occupying any portion of the stretch of track ST. The track relays 1T to 7T, inclusive, are thus energized and their armatures are in their picked up positions. Relays 1SU and 2SU, which are of the biased type, are deenergized and the armatures are thus occupying their reverse positions. The relays PCD and NCD are also deenergized and their armatures are occupying their reverse positions. This is different from the inactive positions of these relays shown in Fig. 1, and the reason therefore will be given shortly in the following discussion.

Relay XP has its armature in its normal position, the armature having been set there at the end of the last period of operation by direct current energy supplied from terminal B of the source over reverse contacts 11 and 12 of the relays 1SU and 2SU, respectively, wire lead 43, and the lower winding of relay XP to terminal N of the source. This direct current flow in the relay winding is from left to right and is, therefore, in the proper direction to cause the relay armature to move to, or to hold in, the normal position. From the description of operation of the apparatus of Fig. 4, it is apparent that first half cycle operation of relay XP could be accomplished with either its normal or reverse contacts initially closed. However, as was discussed in describing the operation of the apparatus of Fig. 1, it is necessary that the initial movement of the armature of relay XP be from the normal to the reverse position so that energy will be properly supplied to the unit CRC to continue immediately the operation of the counting chain relays.

It should be noted that there is no connection between this direct current circuit for resetting the armature of relay XP and the alternating current circuits for operating the relay as a cycle repeater. This is due to the fact that only one winding of the relay XP is required for its operation as an alternating current cycle repeater and the second or lower winding is then available solely for the purpose of resetting the relay to its normal position. Since the lack of any connection between the sources of direct current energy and alternating current energy automatically eliminates the possibility of a "run-around" circuit which would prevent the resetting of relay XP, it is not necessary to retain the armatures of relays PCD and NCD in their normal position, as in the apparatus of Fig. 1, to open such a circuit at the reverse contacts of these relays. Thus the relays PCD and NCD, as described previously, may be allowed to hold their armatures in the biased position during this inactive, or non-measuring condition.

Let us now assume that a railway car enters the stretch of railway track ST particularly, the first section of this stretch of track. The track circuit for section 1 is thus shunted by the leading pair of wheels of the railway car and the relay 1T is deenergized and its armature releases. The closing of back contact 15 of relay 1T completes a circuit for supplying direct current energy to the initiating relay 1SU. This circuit may be traced from terminal B of the source over front contacts 15 of the relays 7T to 2T, inclusive, back contact 15 of relay 1T, wire 16, both windings of relay 1SU in series, reverse contact 17 of relay 2SU, wire lead 18, various circuits in the unit CRC, and finally through the winding of relay 1U to terminal N of the source. The flow of direct current through both windings of the relay 1SU is from left to right, which is the proper direction to cause the relay armature to operate to its normal position, closing normal contacts. It should be noted that relay 1U, the first relay of the unit counting chain, is also energized at this time and its armature picks up. The opening of reverse contact 11 of relay 1SU opens the reset circuit for the relay XP; but this relay, being of the magnetic stick type, initially remains with its normal contacts closed.

We shall assume that this first half cycle of the alternating current, after the normal contacts of relay 1SU close, is a "positive half cycle". The closing of normal contact 19 of relay 1SU completes the circuit for supplying alternating current energy to the cycle detector relays PCD and NCD. This circuit may be traced from terminal BX of the source over normal contact 19 of the relay 1SU, wire 36, and then either over reverse contact 20 of relay NCD, rectifier 21, and the upper winding of relay PCD to terminal NX of the source, or over reverse contact 22 of relay PCD, rectifier 23, and the upper winding of relay NCD to terminal NX of the source. Since terminal BX is now positive, the rectifier 23 prevents the flow of any current through the winding of relay NCD and this relay remains deenergized and its armature does not operate. However, rectifier 21 is poled to permit current flow in the other portion of this described multiple circuit through the upper winding of relay PCD. The direction of the current flow, from left to right, is such as to cause the armature of relay PCD to operate to its normal position closing normal contacts. This opens reverse contact 22 of relay PCD which interrupts the circuit for supplying alternating current energy to relay NCD, which thus remains deenergized during the present period of operation.

The closing of normal contact 26 of relay PCD completes a direct current stick circuit for this relay. This circuit can be traced from terminal B of the source over front contacts 15 of relays 7T to 2T, inclusive, back contact 15 of relay 1T, wire 16, the windings of relay 1SU, reverse contact 17 of relay 2SU, normal contact 24 of relay 1SU, wire 25, normal contact 26 of relay PCD, and the lower winding of relay PCD to terminal N of the source. The direction of current flow in this circuit is proper to retain the armature of relay PCD in its normal position. As previously described, the presence of rectifier 21 makes the described stick circuit effective in retaining the armature of relay PCD in its normal position throughout the remainder of this period of operation.

The closing of normal contact 19 of relay 1SU also completes a circuit for supplying alternating current energy to the cycle repeater relay XP. It should be noted that energy is thus supplied to the cycle repeater relay XP at the same instant as it is applied to the relays PCD and NCD; that is, during the first half cycle of the alternating current after the normal contacts of the initiating relay are closed. The circuit for supplying this energy to relay XP may be traced from terminal BX of the source over normal contact 19 of relay 1SU, wire 27, normal contact 42 of relay XP, rectifier 29, reverse contact 30 of relay NCD, the upper winding of relay XP, reverse contact 32 of relay NCD, rectifier 33, and normal contact 28 of relay XP to terminal NX of the source. Since terminal BX is positive, the flow of current is in the direction from right to left through the winding of relay XP and this causes the armature of this relay to operate to its reverse position closing the reverse contacts. During the short interval before relay PCD operates its armature to its normal position, the flow of current over reverse contact 41 of relay PCD is blocked by rectifier 40, which is so poled as to prevent this flow of current.

The closing of the reverse contacts of relay XP completes a circuit for the flow of current during the next or second half cycle of the alternating current. This circuit may be traced from terminal NX of the source over reverse contact 42 of relay XP, rectifier 29, reverse contact 30 of relay NCD, the upper winding of relay XP, reverse contact 32 of relay NCD, rectifier 33, reverse contact 28 of relay XP, wire 27, and normal contact 19 of relay 1SU to terminal BX of the source. Since this second half cycle is a "negative half cycle", the flow of current is again from right to left in the winding of relay XP. Because the relay armature is already in its reverse position, no further action occurs during this second half cycle.

During the third half cycle after the normal contacts of the initiating relay have closed, which is again a "positive half cycle" so that terminal BX is positive, current flows in a circuit passing from terminal BX of the source through normal contact 19 of relay 1SU, wire 27, reverse contact 28 of relay XP, rectifier 39, normal contact 31 of relay PCD, the upper winding of relay XP, normal contact 41 of relay PCD, rectifier 40, and reverse contact 42 of relay XP to terminal NX of the source. Since this flow of current is in the direction from left to right in the winding of relay XP, the armature of this relay is caused to operate to its normal position.

The next, or fourth half cycle, is again a "negative half cycle" so that the current flow is from terminal NX of the source over normal contact 28 of relay XP, rectifier 39, normal contact 31 of relay PCD, the upper winding of relay XP, normal contact 41 of relay PCD, rectifier 40, normal contact 42 of relay XP, wire 27, and normal contact 19 of relay 1SU to terminal BX of the source. This current is in the proper direction in the relay winding to cause the armature to move to its normal position, but since it is already occupying this position, no action occurs during this half cycle. This completes one cycle of operation of the relay XP and the cycle will continue to be repeated as long as the leading pair of wheels of the railway car occupies track section 1.

As previously described during the discussion of the operation of the apparatus in Fig. 1, the operation of relay XP to alternately close its reverse and normal contacts on alternate cycles of the alternating current causes direct current energy to be supplied to the unit CRC over the normal and reverse contacts 34 of relay XP. Since relay 1U of the unit counting relay chain was energized in series with relay 1SU, the closing of reverse contact 34 of relay XP during the first half cycle will continue the operation of the counting relay chain by energizing the second relay in the unit chain. The remaining relays of the counting chain will be successively energized as the normal and reverse contacts 34 are alternately closed. Thus the action of the counting relays is continued during the first half cycle of the alternating current after the initiating relay has closed its normal contacts.

Let us now assume that the railway car enters track section 2; that is, the leading pair of wheels of the car enters section 2. The track circuit is thus shunted, relay 2T is deenergized, and its armature releases. The opening of front contact 15 of relay 2T deenergizes relays 1SU and PCD. Since these relays are of the biased type, their armatures immediately return to the reverse position. Release of the armature of relay 1SU halts the operation of the cycle repeater relay XP by opening normal contact 19 and further opens the direct current stick circuit for PCD at normal contact 24. During the brief time the armatures of relay 1SU and relay 2SU are both occupying their reverse positions, direct current energy is supplied over a circuit previously described to reset the armature of relay XP to its normal position if it is not already occupying this position. Energy is also removed from the unit CRC during this period and the various relay chains reset to prepare for a new period of operation.

The closing of back contact 15 of relay 2T completes a circuit for supplying direct current energy to the relay 2SU. This circuit may be traced from terminal B of the source over front contacts 15 of the relays 7T to 3T, inclusive, back contact 15 of relay 2T, wire lead 35, both windings of relay 2SU in series, reverse contact 24 of relay 1SU, wire 18, and various circuits in the unit CRC ending with the winding of relay 1U to terminal N of the source. The direction of current flow in both windings of relay 2SU is of the proper direction to cause the armature to move to its normal position closing normal contacts. Again, relay 1U is also energized and its armature picks up. The opening of reverse contact 12 of relay 2SU interrupts the reset circuit for the relay XP, but as before, this relay initially remains with its normal contacts closed since it is of the magnetic stick type.

I shall now assume that the first half cycle of the alternating current, after the armature of relay 2SU closes its normal contacts, is a "negative half cycle". The closing of normal contact 37 of relay 2SU completes the circuit for supplying alternating current energy to the relays PCD and NCD as previously described, except that normal contact 37 of relay 2SU replaces the normal contact 19 of relay 1SU in the circuit. However, since terminal NX is now positive, current is prevented from flowing in the upper winding of relay PCD by the rectifier 21, which is so poled as to block current of this direction. Current does flow, however, in the upper winding of relay NCD in the direction from left to right. This is in the proper direction to cause this relay to move its armature to its normal position closing normal contacts. The opening of reverse contact 20 of relay NCD opens the alternating current energy supply for relay PCD and its armature will remain in its reverse position during the present period of operation.

The closing of normal contacts 38 of relay NCD completes a stick circuit for supplying direct current energy to this relay. This circuit may be traced from terminal B of the source over front contacts 15 of the relays 7T to 3T, inclusive, back contact 15 of relay 2T, wire lead 35, the windings of relay 2SU, reverse contact 24 of relay 1SU, normal contact 17 of relay 2SU, wire lead 25, normal contact 38 of relay NCD, and the lower winding of relay NCD to terminal N of the source. The direction of current flow through the lower winding of the relay is of the proper direction to retain its armature in the normal position and, because of the action of rectifier 23, as previously described, the armature remains in this position for the duration of the present period of operation.

When normal contact 37 of relay 2SU closed, it also completed a circuit for supplying alternating current energy to the cycle repeater relay XP. During this first half cycle, the current flow is from terminal NX of the source over normal contact 28 of relay XP, rectifier 39, reverse contact 31 of relay PCD, the upper winding of relay XP, reverse contact 41 of relay PCD, rectifier 40, normal contact 42 of relay XP, wire 27, and normal contact 37 of relay 2SU to terminal BX of the source. The flow of current from right to left in the upper winding of relay XP is such as to cause the relay armature to operate to its reverse position closing reverse contacts. Prior to the operation of the armature of relay NCD to its normal position, the rectifier 33 blocks the flow of any opposing current over reverse contact 32 of relay NCD.

A circuit is now completed for the flow of current during the next half cycle of alternating current, a "positive half cycle", from terminal BX of the source over normal contact 37 of relay 2SU, wire 27, reverse contact 28 of relay XP, rectifier 39, reverse contact 31 of relay PCD, the upper winding of relay XP from right to left, reverse contact 41 of relay PCD, rectifier 40, and reverse contact 42 of relay XP to terminal NX of the source. However, the armature of relay XP is already in its reverse position so that this flow of current has no farther effect upon the position of the relay armature.

During the third half cycle, when terminal NX is again positive, the flow of current is from terminal NX of the source over reverse contact 42 of relay XP, rectifier 29, normal contact 30 of relay NCD, the upper winding of relay XP in the direction from left to right, normal contact 32 of relay NCD, rectifier 33, reverse contact 28 of relay XP, wire 27, and normal contact 37 of relay 2SU to terminal BX of the source. The flow of current in this direction causes the relay armature to move to its normal position, again closing normal contacts.

During the fourth half cycle of the alternating current after normal contacts of relay 2SU are closed, the circuit for the alternating current energy may be traced from terminal BX of the source over normal contact 37 of relay 2SU, wire 27, normal contact 42 of relay XP, rectifier 29, normal contact 30 of relay NCD, the upper winding of relay XP, normal contact 32 of relay NCD, rectifier 33, and normal contact 28 of relay XP to terminal NX of the source. The direction of current flow in this circuit through the relay winding is from left to right. However, since the relay armature is already in its normal position, no action occurs during this half cycle. This completes one cycle of operation for the cycle repeater relay XP and similar operation will continue as long as the leading pair of wheels of the railway car occupies section 2 of the stretch of track. Also, the unit and multiple counting relays are again activated by the direct current energy supplied over the normal and reverse contacts 34 of relay XP as the relay armature alternately operates to reverse and normal positions during alternate cycles of the alternating current.

It is to be noted that at the instant either normal contact 19 of relay 1SU or normal contact 37 of relay 2SU closes, all contacts of relays PCD and NCD are in their reverse positions. The operation of relay XP during the first half cycle depends on the reverse contacts of either NCD or relay PCD according as the first half cycle is positive or negative, respectively. It is not until later half cycles after the normal contacts of the initiating relay have closed (the third, seventh, eleventh, etc.) that normal contacts of either relay PCD or NCD enter the operating circuit for the relay XP. Thus, the instantaneous energization of relay XP and either relay PCD or NCD, and the resultant operation of the armature of relay XP, are possible during the first half cycle.

Similar action occurs as the railway car continues to traverse the stretch of railway track ST with the action of the relay XP being initiated alternately by relay 1SU and relay 2SU, as the leading pair of wheels of the car occupies an odd-numbered track section, or an even-numbered track section, respectively.

The principal advantage of the arrangement of apparatus in Fig. 3 is the complete separation of the direct current and alternating current sources, since only one winding of relay XP is required for operation of the relay as an alternating current cycle repeater. This results in the elimination of the two reactors, 13 and 14, and the two rectifiers, 44 and 45, required for the arrangement of Fig. 1. However, the contact structure of the three relays is more complex. Three sets of dependent normal and reverse contacts are required for relay XP. Each of relays PCD and NCD required two sets of dependent normal and reverse contacts, in addition to one independent contact of each type. Either arrangement of apparatus provides equivalent operation and the particular advantages desired are a matter of choice.

As has been described, in either arrangement of apparatus as shown in Figs. 1 and 3, the cycle repeater relay always initially operates during the first half cycle of the alternating current after the normal contacts of the initiating relay are closed. Since the first relay of the counting chain is energized at the same time as the initiating relay and the second relay of the counting chain is energized as a result of the initial operation of the cycle repeater relay, practically no time is lost from the count which determines the speed of a car in a track section. Only if the initiating contact (19 or 37 normal) closes during the waning portion of a half cycle of the alternating current is there any loss of time. If the constant frequency used is 60 cycles per second, the usually accepted standard, this loss of time is less than 4 milliseconds. Assuming a speed of fifteen miles per hour for a railway car moving through the car retarder, this error is less than 3%, or less than ½ mile per hour in the indicated speed. Since the speed of other faster moving vehicles will usually be measured over longer distances than the track sections provided in a car retarder, the error in such cases will also be small.

Although I have herein shown and described only two forms of apparatus for an alternating current cycle repeater for measuring time embodying my invention, it is understood that various changes and modifications may be made therein within the scope of the appended claims without departing from the spirit and scope of my invention.

Having thus described my invention, what I claim is:

1. An alternating current cycle repeater, having first half cycle starting under all conditions, comprising, a magnetic stick relay having contacts which occupy a first position when said stick relay is energized with a first polarity, and which occupy a second position when said stick relay is energized with a second polarity; a pair of biased relays having contacts which occupy a first position when said biased relays are energized with said first polarity, and which are biased to occupy a second position when said biased relays are deenergized or are energized with said second polarity; a source of constant frequency alternating current, a source of direct current initiating contacts which occupy a first position to initiate and to continue operation of said cycle repeater and to occupy a second position when said cycle repeater is not operating; detector circuit means including said alternating current source, a first position initiating contact, half-wave rectifiers, and second position contacts and a first winding of each of said biased relays, to detect polarity of a first half cycle of said alternating current, after said first position initiating contacts close, by selective operation of one or the other of said biased relays; stick circuit means, including said direct current source, another first position initiating contact, and, in multiple, a first position contact and a second winding of each of said biased relays to retain said selectively operated biased relay in said first position; operating circuit means for said stick relay, including said alternating current source, a first position initiating contact, first position and second position contacts of said stick relay, contacts of said biased relays, and half-wave rectifiers, so poled that said stick relay always operates on said first half cycle of said alternating current and on every second half cycle thereafter, alternately moving between its first and second positions, thereby repeating the cycles of said alternating current.

2. In combination, to provide an alternating current cycle repeater, a source of constant frequency alternating current, a magnetic stick relay, having contacts which occupy a first position when said stick relay is energized with a first polarity, and which occupy a second position when said stick relay is energized with a second polarity, to repeat the cycles of said alternating current; a set of initiating contacts, operable by external control to occupy a first position to initiate and continue operation of said stick relay to repeat the cycles of said alternating current, and to occupy a second position to halt operation of said stick relay; a source of direct current; a pair of cycle detector relays of the biased type, one or the other of which is selectively operable to a first position according as a first half cycle of said alternating current supplied over a first position initiating contact is of relative positive or negative polarity, said selectively operated detector relay being retained in said first position by said direct current over another first position initiating contact; operating circuit means, including said alternating current source, a first position initiating contact, contacts of said detector relays, first and second position contacts of said stick relay, and half-wave rectifiers, so poled that said stick relay is caused to operate on said first half cycle of said alternating current supplied over said last mentioned initiating contact, and on every second half cycle thereafter, regardless of relative polarity of said first half cycle, alternately moving between its first and second positions, thereby repeating the cycles of said alternating current.

3. Apparatus for measuring periods of time by counting the elapsed cycles of an alternating current, comprising a cycle repeater relay of the magnetic stick type, operable to a first position and a second position, when energized with a first polarity and a second polarity, respectively; two cycle detector relays of the biased type, each operable to a first position only when energized with said first polarity, and biased to a second position when deenergized or when energized with said second polarity; a source of constant frequency alternating current, a source of direct current, a pair of initiating contacts, operable together to a first position in response to an external action, to initiate and to continue the measuring of a period of time, and biased to a second position at all other times; a timing means, a pickup circuit for each said detector relay, comprising a first position initiating contact, said source of alternating current, a half-wave rectifier, a second position contact of the other detector relay, and a first winding of said detector relay, said elements in each said pickup circuit being so poled that only one or the other said detector relay is selectively operated, according as the relative polarity of a first half cycle of said alternating current, after said first position initiating contacts are closed, is positive or negative, respectively; a stick circuit for each said detector relay, comprising another first position initiating contact, said source of direct current, a first position contact and a second winding of said detector relay; an operating circuit means for said cycle repeater relay, said operating circuit means comprising said first mentioned first position initiating contact, said source of alternating current, contacts of said detector relays, first and second position contacts and winding of said cycle repeater relay, and half-wave rectifiers so poled that said cycle repeater relay operates on said first half cycle of said alternating current, regardless of the relative polarity of said half cycle and the initial position of contacts of said cycle repeater relay, and continues to alternately operate between its first and second positions every second half cycle thereafter during said period of time; and an activating circuit for said timing means, comprising said source of direct current and a first and a second position contact, alternately, of said cycle repeater relay, to successively energize said timing means each cycle of said alternating current while said first position initiating contacts are closed, whereby the elapsed cycles of said alternating current may be recorded and the length of said period of time thus determined.

4. In combination, for measuring the speed of a vehicle, a fixed distance in the trackway traversed by said vehicle, an initiating relay, operable to a first position in response to said vehicle occupying said fixed distance and biased to a second position when said fixed distance is unoccupied; a source of direct current, a source of constant frequency alternating current, a chain of counting relays, a cycle repeater relay of the magnetic stick type, operable to a first position when energized with a first polarity and to a second position when energized with a second polarity; a pair of cycle detector relays of the biased type, each operable to a first position when energized with said first polarity, and biased to a second position under all other conditions; detector circuit means to determine the relative polarity of a first half cycle of said alternating current after said initiating relay closes first position contacts, said detector circuit means including said source of alternating current, a first position contact of said initiating relay, and, in series, a winding of a first of said detector relays, a half-wave rectifier, and a second position contact of a second of said detector relays, in multiple with a winding of said second detector relay, another half-wave rectifier, and a second position contact of said first detector relay in series, said detector circuit means so poled that only one of said detector relays is selectively operated according as said first half cycle is positive or negative; stick circuit means, to retain said selectively operated detector relay in its first position, including said direct current source, a first position contact of said initiating relay, and a first position contact and another winding of each said detector relay in multiple; operating circuit means for said cycle repeater relay, including said alternating current source, a first position contact of said initiating relay, contacts of said pair of detector relays, other half-wave rectifiers, and first and second position contacts of said cycle repeater relay, to apply said alternating current to said cycle repeater relay so poled that said cycle repeater relay operates always during said first half cycle, and during every second half cycle thereafter continues to alternately operate between its first and second positions while said first position contacts of said initiating relay are closed; and an activating circuit means including said direct current source; a first position and a second position contact, alternately, of said cycle repeater relay, and said chain of counting relays, to successively energize said counting relays to record the number of cycles of said alternating current which elapse during the period said vehicle occupies said fixed distance, whereby the speed of said vehicle may be accurately determined.

5. In combination, an initiating contact which is closed during selected times; a source of alternating current; a relay of the magnetic stick type operable to a normal and a reverse position; circuit means, including said alternating current source, said initiating contact in its closed position, and normal and reverse contacts of said relay, to apply said alternating current to said relay so that said relay will operate alternately to said normal and said reverse positions on every positive half cycle of said alternating current.

6. In combination, an initiating contact which is closed during selected times; a source of alternating current; a relay of the magnetic stick type operable to a normal and a reverse position; circuit means, including said alternating current source, said initiating contact in its closed position, and normal and reverse contacts of said relay, to apply said alternating current to said relay so that said relay will operate alternately to said normal and said reverse positions on every negative half cycle of said alternating current.

7. An alternating current cycle repeater, comprising a relay of the magnetic stick type operable to a first and a second position, respectively, a source of constant frequency alternating current, an initiating contact operable to a closed position in response to an external action to energize said stick relay, and biased to an open position at other times; operating circuit means comprising said alternating current source, said closed position initiating contact, and first and second position contacts of said relay, whereby said alternating current is applied to said relay so poled that said relay operates alternately to said first and said second positions on every second half cycle of said alternating current, thereby repeating the cycles of said alternating current.

8. Apparatus for measuring time comprising a pair of contacts independently operable, a source of constant frequency alternating current, a first electro-responsive means operably connected to said pair of contacts for alternately closing said pair of contacts at a constant frequency when said first means is energized by said alternating current; a chain of counting relays; a second means for initiating operation of said apparatus to measure a period of time, said second means including a source of direct current, said source of alternating current, and a contact, operable to a first position in response to an external action at the beginning of said period of time measuring, and biased to a second position at other times; a third means including said direct current source and said pair of contacts for energizing successive relays in said counting chain, one relay being energized each time one or the other of said pair of contacts closes; a fourth means for setting said first means into operation during a first half cycle of said alternating current after said second means has closed said first position contact, said fourth means including a pair of detector relays of the biased type which are interconnected to said alternating current source by said second means to selectively energize said detector relays according to the polarity of said first half cycle of said alternating current, the selected relay of said pair being further energized by a stick circuit connected to said direct current source, said detector relays having contacts interposed between said first means and said alternating current source, so that said alternating current will be so poled that said first means will begin operation during said first half cycle after said first position contact of said second means closes; and a fifth means, including said biased position contact of said second means, whereby said pair of contacts and said first means are reset to a selected initial position, at the end of each period of time measuring, so that said first means will begin operation during said first half cycle and said counting chain will be activated simultaneously with said pair of contacts at the beginning of each period of time measuring.

9. In combination, for measuring periods of time, an initiating relay, operable to a first position in response to an external action to initiate a period of time measuring biased to a second position when no time is being measured; a source of constant frequency alternating current, a source of direct current, a cycle repeater relay of the magnetic stick type, operable to a first position when energized with a first polarity and to a second position when energized with a second polarity; two cycle detector relays of the biased type, each said detector relay operable to a first position only when energized by current in a proper direction and at other times biased to a second position; a detector circuit for each said detector relay, each said detector circuit including said source of alternating current, a first position contact of said initiating relay, and a second position contact of the other detector relay, whereby the one or the other of said detector relays selectively operates on a first half cycle of said alternating current after said initiating relay has operated to close said first position contacts, according as said first half cycle is of relative positive or negative polarity; a stick circuit for each said detector relay, including said direct current source, a first position contact of said initiating relay, and a first position contact of said each detector relay, to retain said selectively operated detector relay in its first position during a period of time measuring; reset circuit means, including said direct current source, a second position contact of said initiating relay, and a winding of said cycle repeater relay, to operate said cycle repeater relay to a selected position at the end of each period of operation; an operating circuit means, including said alternating current source, a first position contact of said initiating relay, first position contacts of said selectively operated detector relay, second position contacts of said detector relay not selectively operated, first and second position contacts, alternately, and a winding of said cycle repeater relay, and half-wave rectifiers, so poled that said cycle repeater relay, being in its first position, operates to its second position during said first half cycle of said alternating current, after said initiating relay has closed its first position contacts, and alternately operates to its first and second position during every second half cycle thereafter; a timing means, and another circuit, including said direct current source and a first position and a second position contact, alternately, of said cycle repeater relay to cause said timing means to operate on successive operations of said cycle repeater relay to count the cycles of said alternating current, whereby the period of time can be accurately measured.

10. In combination with apparatus for measuring the speed of a vehicle as it traverses a fixed distance, said apparatus including an initiating relay, operable to a first position in response to the occupation of said fixed distance by said vehicle and biased to a second position when said fixed distance is unoccupied, a source of constant frequency alternating current, a source of direct current, and a timing means to count the cycles of said alternating current during passage of said car through said fixed distance; means for activating said timing means successively on each cycle of said alternating current, beginning always on a first half cycle of said alternating current after said initiating relay has closed its first position contacts; said means comprising a cycle repeater relay of the magnetic stick type, operable to a first and a second position when energized with a first and a second polarity, respectively; a pair of cycle detector relays of the biased type, operable to a first position when energized with a proper polarity and biased to a second position under all other conditions; a pickup circuit for each said detector relay, each said pickup circuit including said alternating current source, a first position contact of said initiating relay, and a second position contact of the other detector relay, whereby said detector relays are selectively operated according to the polarity of said first half cycle of said alternating current after said initiating relay closes first position contacts; a stick circuit for each said detector relay, including said direct current source, a first position contact of said initiating relay, and a first position contact of said detector relay, to retain said selectively operated detector relay in its first position; operating circuit means for said cycle repeater relay, including said alternating current source, a first position contact of said initiating relay, second position contacts of said detector relays, a first and a second position contact of said cycle repeater relay, and half-wave rectifiers, poled to cause said cycle repeater relay to operate on said first half cycle of said alternating current after said initiating relay closes first position contacts, regardless of polarity of said first half cycle, and to operate on every second half cycle thereafter; another circuit, including said direct current source and another first and another second position contact of said cycle repeater relay, to successively energize said timing means to count said cycles of said alternating current; and reset circuit means, including said direct current source, a second position contact of said initiating relay, and a reactor in multiple with a winding of each detector relay, to reset and retain said cycle repeater relay and said detector relays in said first position when apparatus is not measuring vehicle speed, said reactors causing said detector relays to return quickly to their second position when said initiating relay operates to begin a new period of speed measuring.

11. In apparatus for measuring the speed of a vehicle, comprising an initiating relay operable in response to an external action of said vehicle, a source of constant frequency alternating current, a source of direct current, a chain of counting relays responsive to energy supplied alternately over a pair of contacts to count operations of said pair of contacts; means to actuate said pair of contacts to repeat cycles of said alternating current while said vehicle speed is being measured; said means comprising a magnetic stick relay, two biased relays, half wave rectifiers, a first circuit means including said direct current source, a released position contact of said initiating relay, and a winding of each of said magnetic stick and said biased relays to retain these relays in their normal position when apparatus is not operating; a second circuit means including said alternating current source, an operated position contact of said initiating relay, and, in multiple, a second winding of each of said biased relays in series with one of said half-wave rectifiers and a biased position contact of the other of said biased relays to selectively operate one or the other of said biased relays according as an initial half cycle of alternating current, after said initiating relay operates, is positive or negative, respectively; holding circuit means, to retain said selectively operated biased relay in said normal position, including said direct current source, an operated position contact of said initiating relay, and a normal contact and said first winding of said selectively operated biased relay; operating circuit means to cause said magnetic stick relay to operate on said first half cycle of said alternating current, and on every second half cycle thereafter, said operating circuit means comprising said constant frequency alternating current source, an operated position contact of said initiating relay, biased position contacts of said biased relays, normal and reverse contacts, alternately, of said magnetic stick relay, and windings of said magnetic stick relay.

12. In combination, for measuring the speed of a vehicle, a fixed distance in the trackway traversed by said vehicle, an initiating relay, operable to a first position in response to said vehicle occupying said fixed distance and biased to a second position when said fixed distance is unoccupied; a source of direct current, a source of constant frequency alternating current, a chain of counting relays, a cycle repeater relay of the magnetic stick type, operable to a first position when energized with a first polarity and to a second position when energized with a second polarity; a pair of cycle detector relays of the biased type, each operable to a first position when energized with said first polarity, and biased to a second position under all other conditions; detector circuit means to determine the relative polarity of a first half cycle of said alternating current after said initiating relay closes first position contacts, said detector circuit means including said source of alternating current, a first position contact of said initiating relay, and, in series, a winding of a first of said detector relays, a half-wave rectifier, and a second position contact of a second of said detector relays, in multiple with a winding of said second detector relay, another half-wave rectifier, and a second position contact of said first detector relay in series, said detector circuit means so poled that only one of said detector relays is selectively operated according as said first half cycle is positive or negative; stick circuit means, to retain the selectively operated detector relay in its first position, including said direct current source, a first position contact of said initiating relay, and a first position contact and another winding of each said detector relays in multiple; operating circuit means for said cycle repeater relay, including said alternating current source, a first position contact of said initiating relay, first position contacts of said selectively operated detector relay, second position contacts of the non-operated detector relay, other half-wave rectifiers, and first and second position contacts of said cycle repeater relay, to apply said alternating current to a winding of said cycle repeater relay so poled that said cycle repeater relay operates during said first half cycle of said alternating current, and during every second half cycle thereafter operates alternately between its first and second positions, respectively, while said first position contacts of said initiating relay are closed; reset circuit means including said direct current source, a second position contact of said initiating relay, and another winding of said cycle repeater relay, to cause said cycle repeater relay to operate to its first position at the end of a period of operation; and an activating circuit means including said direct current source, a first position and a second position contact, alternately, of said cycle repeater relay, and said chain of counting relays, to successively energize said counting relays to record the number of cycles of said alternating current which elapse during the period said vehicle occupies said fixed distance, whereby the speed of said vehicle may be accurately determined.

13. An alternating current cycle repeater, having first half cycle starting under all conditions, comprising, a magnetic stick relay having contacts which occupy a first position when said stick relay is energized with a first polarity, and which occupy a second position when said stick relay is energized with a second polarity; a pair of biased relays having contacts which occupy a first position when said biased relays are energized with said first polarity, and which are biased to occupy a second position when said biased relays are deenergized or are energized with said second polarity; a source of constant frequency alternating current, a source of direct current, initiating contacts which occupy a first position to initiate and to continue operation of said cycle repeater and which occupy a second position when said cycle repeater is not operating; detector circuit means including said alternating current source, a first position initiating contact, half-wave rectifiers, and second position contacts and a first winding of each of said biased relays, to detect polarity of a first half cycle of said alternating current, after said first position initiating contacts close, by selective operation of one or the other of said biased relays; stick circuit means, including said direct current source, another first position initiating contact, and, in multiple, a first position contact and a second winding of each of said biased relays to retain said selectively operated biased relay in said first position; operating circuit means, including said alternating current source, a first position initiating contact, a first position and a second position contact and two windings of said stick relay, second position contacts of said biased relays, and half-wave rectifiers, so poled that said stick relay always operates on said first half cycle of said alternating current and on every second half cycle thereafter, alternately moving between its first and second positions, thereby repeating the cycles of said alternating current.

14. An alternating current cycle repeater, having first half cycle starting under all conditions, comprising, a magnetic stick relay having contacts which occupy a first position when said stick relay is energized with a first polarity, and which occupy a second position when said stick relay is energized with a second polarity; a pair of biased relays having contacts which occupy a first position when said biased relays are energized with said first polarity, and which are biased to occupy a second position when said biased relays are deenergized or are energized with said second polarity; a source of constant frequency alternating current, a source of direct current, initiating contacts which occupy a first position to initiate and to continue operation of said cycle repeater and occupy a second position when said cycle repeater is not operating; detector circuit means including said alternating current source, a first position initiating contact, half-wave rectifiers, and second position contacts and a first winding of each of said biased relays, to detect polarity of a first half cycle of said alternating current, after said first position initiating contacts close, by selective operation of one or the other of said biased relays; stick circuit means, including said direct current source, another first position initiating contact, and, in multiple, a first position contact and a second winding of each of said biased relays to retain the selectively operated biased relay in said first position; operating circuit means, including said alternating current source, a first position initiating contact, first and second position contacts and a winding of said stick relay, first position contacts of said selectively operated biased relay, second position contacts of the nonoperated biased relay, and half-wave rectifiers, so poled that said stick relay always operates on said first half cycle of said alternating current and on every second half cycle thereafter, alternately moving between its first and second positions, thereby repeating the cycles of said alternating current.

15. In combination with apparatus for repeatedly measuring the speed of a railway car traversing a stretch of railway track comprising a series of track sections formed in said stretch, said sections being of such length that only one pair of wheels of said car can occupy a section at any time, each said section having a track circuit including the rails of said section, a source of track current, and a track relay; said track relay being normally energized and becoming deenergized as said section is occupied by said car; said apparatus including a source of constant frequency alternating current, a source of direct current, two initiating relays, each biased to a released position when deenergized, and operable to an operated position alternately, in response to the successive release of said track relays, as said car progresses through said stretch of track, to initiate the operation of said speed measuring apparatus, and a counting chain of relays; means to activate said counting chain of relays to count cycles of said alternating current to determine accurately the speed of said car in any one of said sections; said means comprising a cycle repeater relay of the magnetic stick type, operable to a first and a second position when energized with a first or a second polarity, respectively; two cycle detector relays of the biased type, operable to a first position when energized with said first polarity and biased to a second position under all other conditions; reset circuits to reset or to retain said cycle repeater relay and said detector relays in said first position at the end of each period of operation, said reset circuits including said direct current source, released position contacts in series of each of said initiating relays, and a reactor in multiple with a winding of each said detector relay, said reactors providing for quick release of said detector relays at the beginning of a period of operation; a pickup circuit for each said detector relay, including said alternating current source, operated position contacts, in multiple, of said initiating relays, a half-wave rectifier, and a biased position contact of the other of said detector relays, said alternating current being so poled that only one or the other of said detector relays picks up during a first half cycle of said alternating current, after one of said initiating relays closes its operated position contacts, according as said first half cycle is of positive or negative polarity, respectively; a stick circuit for each said detector relay, including said direct current source, operated position contacts, in multiple, of said initiating relays, and a first position contact of said detector relay; operating circuits to cause said cycle repeater relay to begin operation during said first half cycle of said alternating current after said initiating relay has operated to close operated contacts, said operating circuits including said alternating current source, operated position contacts, in multiple, of said initiating relays, biased position contacts of said detector relays, and other half-wave recifiers, so poled that said cycle repeater relay always operates during said first half cycle regardless of polarity, and during every second half cycle thereafter; and a final circuit, including said direct current source and a first and a second position contact of said cycle repeater relay to energize successive relays in said counting chain, one on each operation of said cycle repeater relay, whereby the speed of said vehicle may be determined by the number of elapsed cycles of alternating current.

16. In combination, for repeatedly measuring the speed of a railway car traversing a stretch of railway track, said stretch comprising a series of track sections each being of such length that only one pair of wheels of said car can occupy any section at one time, each said section having a track circuit including the rails of said section, a source of track current, and a track relay; said track relay being normally energized and becoming deenergized as said section is occupied by a leading pair of wheels of said car; a source of constant frequency alternating current, a source of direct current, two initiating relays, each biased to a released position, and operable to an operated position alternately in response to the successive release of said track relays as said car successively occupies said track sections; an alternating current cycle repeater relay of the magnetic stick type, operable to a first position and a second position when energized by a first polarity and a second polarity, respectively; two cycle detector relays of the biased type, operable to a first position when energized by said first polarity, and baised to a second position at other times; a pickup circuit for each said detector relay, including said alternating current source, operated position contacts in multiple of said initiating relays, a biased position contact of the other detector relay, and a half wave rectifier, each said pickup circuit being so poled that only one of said detector relays operates during a first half cycle of said alternating current, after one of said initiating relays has operated to close its operated position contacts, according as the polarity of said first half cycle is positive or negative, respectively; a stick circuit for each said detector relay, including said direct current source, operated position contacts, in multiple, of said initiating relays, and an operated position contact of said detector relay; a reset circuit to reset said cycle repeater relay to a selected initial position at the end of a period of operation, said reset circuit including said direct current source and released position contacts, in series, of said initiating relays; an operating circuit to connect said alternating current to said cycle repeater relay so that said cycle repeater relay operates to repeat the cycles of said alternating current, said operating circuit including said alternating current source, operated position contacts, in multiple, of said initiating relays, first and second position contacts of said cycle repeater relay, first position contacts of the selectively operated detector relay, second position contacts of the nonoperated detector relay, and half-wave rectifiers so poled that said cycle repeater relay will commence operation during said first half cycle; a chain of counting relays, an energizing circuit for said chain of counting relays, including said direct current source and a first and a second position contact, alternately, of said cycle repeater relay, to successively energize successive relays in said counting chains; whereby said chain of counting relays will count the cycles of said alternating current to determine the speed of said car through each of said sections.

References Cited in the file of this patent

UNITED STATES PATENTS

| | | |
|---|---|---|
| 1,958,293 | Bone | May 8, 1934 |
| 2,080,053 | Livingston | May 11, 1937 |
| 2,362,194 | Dodd | Nov. 7, 1944 |
| 2,364,751 | Place | Dec. 12, 1944 |
| 2,454,687 | Baughman | Nov. 23, 1948 |
| 2,461,060 | Johnston | Feb. 8, 1949 |
| 2,475,662 | Dodd | July 12, 1949 |
| 2,536,162 | Field | Jan. 2, 1951 |
| 2,695,346 | Robison | Nov. 23, 1954 |